United States Patent
Adrian Schmidt

(10) Patent No.: US 11,703,031 B2
(45) Date of Patent: Jul. 18, 2023

(54) SAFETY SYSTEM FOR A WIND TURBINE

(71) Applicant: Siemens Gamesa Renewable Energy A/S, Brande (DK)

(72) Inventor: Soeren Adrian Schmidt, Fredericia (DK)

(73) Assignee: SIEMENS GAMESA RENEWABLE ENERGY A/S

(*) Notice: Subject to any disclaimer, the term of this patent is extended or adjusted under 35 U.S.C. 154(b) by 101 days.

(21) Appl. No.: 16/786,518

(22) Filed: Feb. 10, 2020

(65) Prior Publication Data
US 2020/0263663 A1    Aug. 20, 2020

(30) Foreign Application Priority Data
Feb. 14, 2019   (EP) .................................. 19157228

(51) Int. Cl.
F03D 7/02      (2006.01)
F03D 80/50     (2016.01)
F03D 80/80     (2016.01)

(52) U.S. Cl.
CPC ............ *F03D 7/0264* (2013.01); *F03D 80/82* (2016.05)

(58) Field of Classification Search
CPC ........ F03D 7/0264; F03D 80/82; F03D 80/50; F03D 80/00; Y02E 10/72; F05B 2260/31; F05B 2260/30
See application file for complete search history.

(56) References Cited

U.S. PATENT DOCUMENTS

| | | | |
|---|---|---|---|
| 8,169,097 B2* | 5/2012 | Weitkamp | F03D 7/042 290/44 |
| 8,764,393 B2* | 7/2014 | Von Mutius | F03D 80/50 416/61 |
| 8,944,766 B2* | 2/2015 | Nielsen | F03D 80/50 416/169 R |

(Continued)

FOREIGN PATENT DOCUMENTS

| | | |
|---|---|---|
| CN | 104564521 A | 4/2015 |
| CN | 106715894 A | 5/2017 |

(Continued)

OTHER PUBLICATIONS

European Search Report dated Aug. 21, 2019 for Application No. 19157228.8.

(Continued)

*Primary Examiner* — Justin D Seabe
(74) *Attorney, Agent, or Firm* — Schmeiser, Olsen & Watts LLP

(57) ABSTRACT

Provided is a safety system for a wind turbine, the wind turbine including a nacelle, a hub and a rotor blocking system with several rotor locks, each engageable into a locked position for blocking a rotor of the wind turbine from rotating, the safety system including a central switching unit comprising one switch for each of the rotor locks for manually engaging a corresponding rotor lock into the locked position when activating the related switch, and a feedback unit generating and providing a safe-signal in a safe state of the hub, in which every rotor lock is engaged into the locked position. A method for providing safety to a person in the wind turbine as well as a wind turbine with the inventive safety system is also provided.

18 Claims, 2 Drawing Sheets

(56) References Cited

U.S. PATENT DOCUMENTS

| | | | |
|---|---|---|---|
| 10,415,751 B2* | 9/2019 | Geiken | H01H 27/06 |
| 10,634,117 B2* | 4/2020 | Hoffmann | F03D 80/50 |
| 2007/0187954 A1 | 8/2007 | Struve et al. | |
| 2010/0247311 A1* | 9/2010 | Schlangen | F03D 17/00 |
| | | | 416/61 |
| 2011/0123339 A1 | 5/2011 | Eriksen et al. | |
| 2013/0264167 A1 | 10/2013 | Geiken | |
| 2018/0224063 A1 | 8/2018 | Geiken et al. | |

FOREIGN PATENT DOCUMENTS

| | | |
|---|---|---|
| DE | 102009015305 A1 | 9/2010 |
| DE | 102010043436 | 5/2012 |
| DE | 102014218804 A1 | 3/2016 |
| EP | 2740928 A1 | 6/2014 |
| WO | 2005090780 A1 | 9/2005 |

OTHER PUBLICATIONS

Chinese Office Action for Application No. 202010092754.X, dated Aug. 3, 2021.

* cited by examiner

SAFETY SYSTEM FOR A WIND TURBINE

CROSS-REFERENCE TO RELATED APPLICATIONS

This application claims priority to EP Application No. 19157228.8, having a filing date of Feb. 14, 2019, the entire contents of which are hereby incorporated by reference.

FIELD OF TECHNOLOGY

The following relates to a safety system for a wind turbine as well as a wind turbine comprising a nacelle, a hub and a rotor blocking system with several rotor locks, each engageable into a locked position for blocking a rotor of the wind turbine from rotating. Further, embodiments of the invention relate to a method for providing safety to a person in a wind turbine and in a hub of the wind turbine, respectively.

BACKGROUND

As wind turbines are steadily increasing in size, there is need for more rotor clamping and/or blocking force when technicians are working in a hub of the wind turbine. This clamping and blocking force is given by a rotor blocking system comprising rotor locks distributed around the main shaft. Rotor locks used in the wind turbine industry are typically mounted to the main rotor shaft of the wind turbine, between gearbox and generator. The rotor blocking system is activated by running lock bolts into a lock disc using hydraulic power.

Today, each rotor lock must be inserted manually by activating switches in different positions in the nacelle of the wind turbine. With an increasing number of rotor locks, the work and time spent for applying these tasks also increases. With a conventional rotor blocking system, a technician has to engage or disengage each rotor lock manually by activating a switch. When a rotor lock is engaged, a key is released which can be used to open a gate to the hub. Since the key is only related to one rotor lock, it is known that misuse of the system happens, by means of which only one of the rotor locks is engaged, while the key is then used to enter the hub. Due to compromised blocking capacity in this case, this could result in mechanical failure in the rotor lock, after which the turbine could start to idle with the technician in the hub.

SUMMARY

An aspect relates to address at least part of the above-mentioned problems. In particular, an aspect relates to provide a safety system and related method for persons working in the wind turbine for safely, reliably and/or quickly locking the rotor during maintenance works.

According to a first aspect of embodiments of the present invention, a safety system for a wind turbine is provided, wherein the wind turbine comprises a nacelle, a hub and a rotor blocking system with several rotor locks, each engageable into a locked position for blocking a rotor of the wind turbine from rotating. The inventive safety system comprises a central switching unit comprising one switch for each of the rotor locks for manually engaging a corresponding rotor lock into the locked position when activating the related switch and a feedback unit generating from one central position and providing a safe-signal in a safe state of the hub, in which every rotor lock is engaged into the locked position.

By introducing the present safety system, a technician can insert all rotor locks from a central location in the nacelle while receiving the safe signal when all rotor locks are in position. Thus, the technician may recognize at a glance whether the hub is safe to work in or not. This provides the desired safety for the technician in an easy and reliable manner. Moreover, the inventive safety system can be easily adapted to present wind turbines without the need of expensive modifications.

The switches for the rotor locks are configured to manually engage an accompanying rotor lock into the locked position when activating the related switch. For example, a first switch may belong to a first rotor lock, a second switch may belong to a second rotor lock, a third switch may belong to a third rotor lock, etc. When the first switch is activated and/or operated, the first rotor lock will be engaged or released, depending on in which state the switch currently is or which kind of switch is provided. When the second switch is operated, the second rotor lock will be engaged or released. And when the third switch is operated, the third rotor lock will be engaged or released. The switches can be operated manually by a technician. For example, each switch may be provided as a button or a lever and can be pressed or shifted by the technician for operating the same. Alternatively, each switch may be provided as a switch that can only be operated by inserting and/or turning a key in it. Such a key may be a mechanical and/or an electronic key.

As soon as the switches are operated and/or activated and the rotor locks are engaged, the feedback unit generates and provides the safe signal, which can be directly or indirectly recognized by the technician at the central switching unit. That is, the technician does not have to move around in the nacelle in order to check whether all the rotor locks are engaged. This saves time and thus money. As described above, the switches are centrally located at the central switching unit. That is, the switches are arranged in a position in which the technician can operate and/or monitor them without moving.

The rotor blocking system comprises several rotor locks like, two, three, four, five, six, seven or eight rotor locks, wherein there are embodiments possible with even more rotor locks. For safety reasons, each rotor lock can be operated by one related switch only. However, it is also possible that the switches are configured to operate several rotor locks each, like at least one switch is configured to operate two or three rotor locks at once. This saves time and thus money while locking the rotor for maintenance work in the hub of the wind turbine.

The central switching unit comprises a housing to be mounted to an inner wall of the nacelle, wherein the switches are mounted to be operated on one outer wall member of the housing.

Activating a switch means operating the same in order to move the related at least one rotor lock into the engaged position. Consequently, deactivating a switch means operating the same in order to move the related at least one rotor lock into a released position, in which the at least one rotor lock does not block the rotor and the rotor may be able to spin.

The safe signal is particularly generated and provided to be perceived by a person like a technician in the nacelle and in front of the central switching unit, respectively. In addition, the safe-signal may be generated and provided to be received by a computer and/or a machine in order to use the safe-signal for further safety measures. The safe signal can be understood as a signal which provides information about a safety state in the hub, i.e., whether it is safe for a person to enter the hub or not.

According to another aspect of embodiments of the invention, the safety system may comprise a user communication unit connected to the feedback unit for providing the safe-signal in terms of visually and/or acoustically informing a person at the central switching unit in the nacelle about the safe state when receiving the provided safe-signal by the user communication unit. That is, the user communication unit is configured to provide the safe signal in terms of a visual and/or acoustic signal, which can be perceived by a person like a technician in the nacelle and at the central switching unit. A visual and/or acoustic signal is an easy and cheap way to inform the technician about the state in the hub, i.e., whether it is safe to work in there or not. The user communication unit may comprise a display for displaying the safe signal on a display and/or a loudspeaker for a suitable sound signal to inform the technician about the safe state. The display and/or the loudspeaker can be arranged at the central switching unit, specifically, at a housing of the central switching unit. This solution can be provided in a cheap and simple way in particular on the ground that there has to be only one display and only one loudspeaker at the central switching unit, i.e., not at different location as it was necessary in prior art systems. The safe signal can be displayed by means of a color code, like red for not safe and green for safe, or by means of a suitable message, written and/or shown at the display.

Further, it is possible that the safety system according to embodiments of the present invention comprises a controller connected to the feedback unit for unlocking an access door from the nacelle to the hub when receiving the provided safe signal by the controller. This is an additional safety measure and increases the safety for the technician, respectively. According to the described embodiment, the access door will only be unlocked when the controller receives the safe signal. The access door can then be unlocked by means of the controller. That is, the controller is configured to unlock the access door when receiving the provided safe signal. In other words, as long as there is no safe signal received by the controller, the access door will be locked and cannot be entered by a person.

Moreover, an inventive safety system may comprise a door signal unit for providing a locked-signal in a locked state of a door lock of a door from the nacelle to the hub, and a controller connected to the door signal unit for allowing to release any one of the rotor locks only when receiving the locked-signal from the door signal unit. That is, a rotor lock can only be released by means of the switches when the access door is locked. This makes sure, that a rotor lock can only be released when the technician left the hub, closed the access door and then operates one of the switches, which are arranged at the central switching unit in the nacelle, i.e., outside of the hub. Hence, by means of the inventive door signal unit, safety for a person in the hub can be further enhanced.

In accordance with a further embodiment of an inventive safety system, the feedback unit can be integrated into the central switching unit. Thus, the safety system can be provided with a space saving design, which is important in a wind turbine, where saving space is always an issue. The feedback unit can be integrated into a computer and a controller, respectively.

According to another aspect of embodiments of the invention there is provided a wind turbine with a nacelle, a hub, a rotor blocking system comprising several rotor locks, each engageable into a locked position for blocking a rotor of the wind turbine from rotating, and a safety system according to any one of the above described embodiments. Therefore, the inventive wind turbine brings up the same advantages that have been discussed in detail with respect to the inventive safety system. The wind turbine may be configured as an onshore and an offshore wind turbine.

A further aspect of embodiments of the present invention relates to a method for providing safety to a person in a wind turbine with a safety system according to any one of the above described embodiments. The method comprises the steps of recognizing a safe state of the hub, in which every rotor lock is engaged into the locked position and generating as well as providing a safe-signal in said safe state of the hub, in which every rotor lock is engaged into the locked position. Hence, the inventive method also brings up the advantages that have been discussed in detail with respect to the inventive safety system.

The method can be carried out by a computer program product (non-transitory computer readable storage medium having instructions, which when executed by a processor, perform actions) and/or a computer program product can be configured to carry out the method when installed on a memory and/or a computer. In another embodiment of the present invention the computer program product comprises computer readable program means initiating a computer to carry out the prescribed method.

In accordance with a method of embodiments of the present invention, the safe-signal is provided in terms of visually and/or acoustically informing a person at the central switching unit in the nacelle about the safe state by means of a user communication unit connected to the feedback unit when receiving the provided safe-signal by the user communication unit. Further, the inventive method may comprise the step of unlocking an access door from the nacelle to the hub by means of a controller connected to the feedback unit when receiving the provided safe signal by the controller. Moreover, the method according to embodiments of the present invention may comprise the steps of providing a locked-signal in a locked state of a door lock of a door from the nacelle to the hub by means of a door signal unit, and allowing to release any one of the rotor locks only when receiving the locked-signal from the door signal unit by means of a controller connected to the door signal unit.

BRIEF DESCRIPTION

Some of the embodiments will be described in detail, with reference to the following figures, wherein like designations denote like members, wherein.

DETAILED DESCRIPTION

Figure 1:
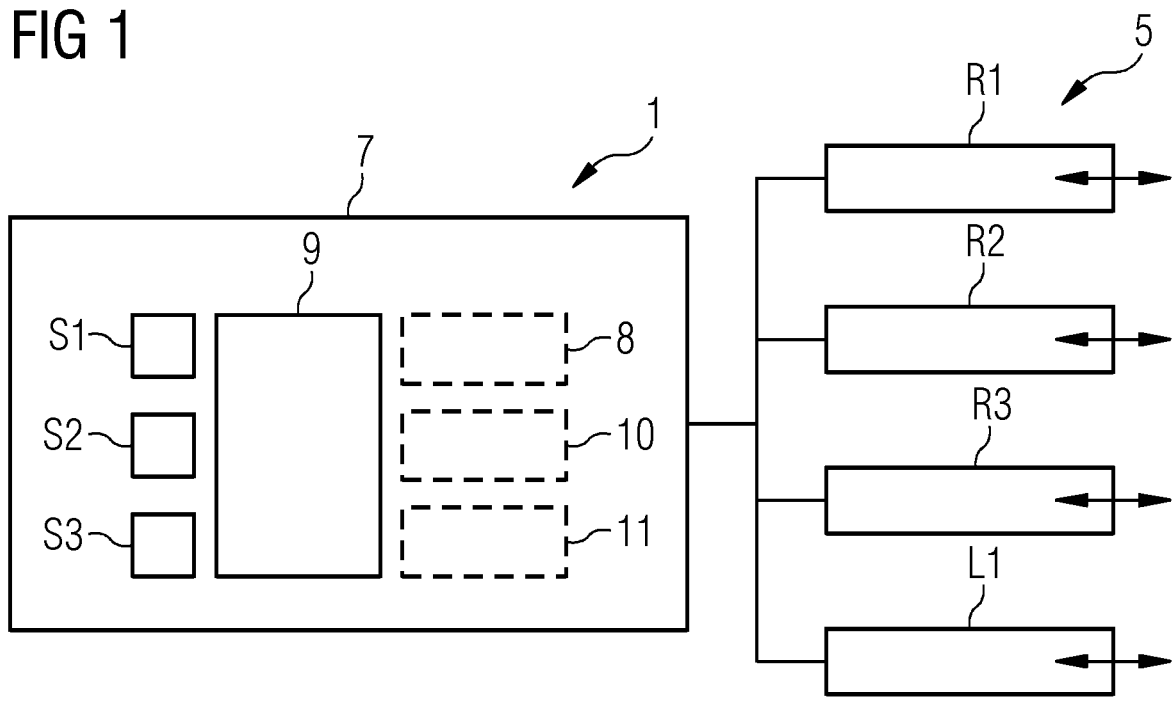
FIG. 1 shows a block diagram for explaining a safety system according to an exemplary embodiment of the present invention.
Figure 4:
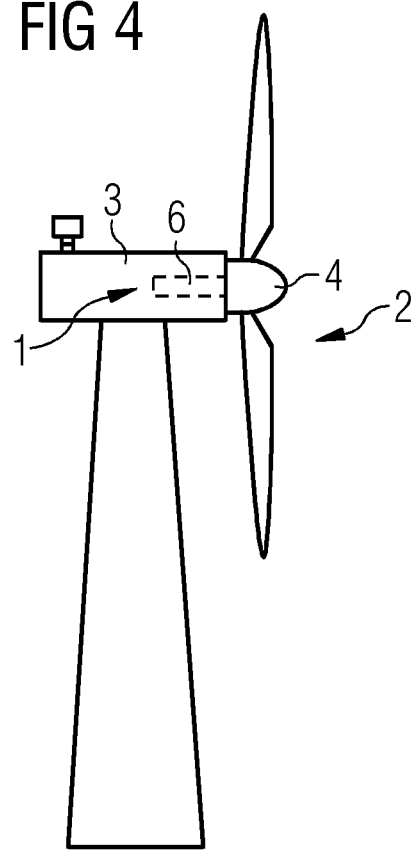
FIG. 4 shows a wind turbine with an inventive safety system.

FIG. 1 shows a safety system 1 for a wind turbine 2 with a nacelle 3, a hub 4 and a rotor blocking system 5 with three rotor locks R1, R2, R3, each engageable into a locked position for blocking a rotor 6 of the wind turbine 2 from rotating. The wind turbine 2 with its components is shown in FIG. 4.

The safety system 1 of FIG. 1 is shown in the form of a block diagram to simplify the explanation of the same. As shown in FIG. 1, the safety system 1 includes a central switching unit 7 comprising one switch S1, S2, S3 for each of the three rotor locks R1, R2, R3 for manually engaging a corresponding rotor lock R1, R2, R3 into the locked position when activating the related switch S1, S2, S3. According to FIG. 1, a first switch S1 belongs to a first rotor lock R1, a second switch S2 belongs to a second rotor lock R2, and a third switch S3 belongs to a third rotor lock R3. When the first switch S1 is operated, the first rotor lock R1 will be engaged or released. When the second switch S2 is operated, the second rotor lock R2 will be engaged or released. And when the third switch S3 is operated, the third rotor lock R3 will be engaged or released. The switches S1, S2, S3 are configured to be operated manually by a technician. Specifically, each switch S1, S2, S3 can only be operated by means of a specific activation key.

The safety system 1 further comprises a feedback unit 8 generating and providing a safe signal in a safe state of the hub 4, in which every rotor lock R1, R2, R3 is engaged into the locked position. As can be drawn from FIG. 1, the feedback unit 8 is integrated into the central switching unit 7.

Moreover, the safety system 1 comprises a user communication unit 9 connected to the feedback unit 8 for providing the safe-signal in terms of visually informing a person at the central switching unit 7 in the nacelle 3 about the safe state when receiving the provided safe-signal by the user communication unit 9. According to FIG. 1, the user communication unit 9 comprises a display to show the technician or any other user the safety state of the hub, i.e., whether it is safe to work in there or not. In addition to the display, there may also be arranged a loudspeaker at the central switching unit 7 to inform a user about the safety state in the hub acoustically, for example.

Furthermore, the safety system 1 comprises a controller 10 connected to the feedback unit 8 for unlocking an access door from the nacelle 3 to the hub 4 when receiving the provided safe signal by the controller 10.

In addition, the safety system 1 of FIG. 1 comprises a door signal unit 11 for providing a locked-signal in a locked state of a door lock L1 of a door from the nacelle 3 to the hub 4, and a controller 10 connected to the door signal unit 11 for allowing to release any one of the rotor locks R1, R2, R3 only when receiving the locked-signal from the door signal unit 11.

Figure 2:
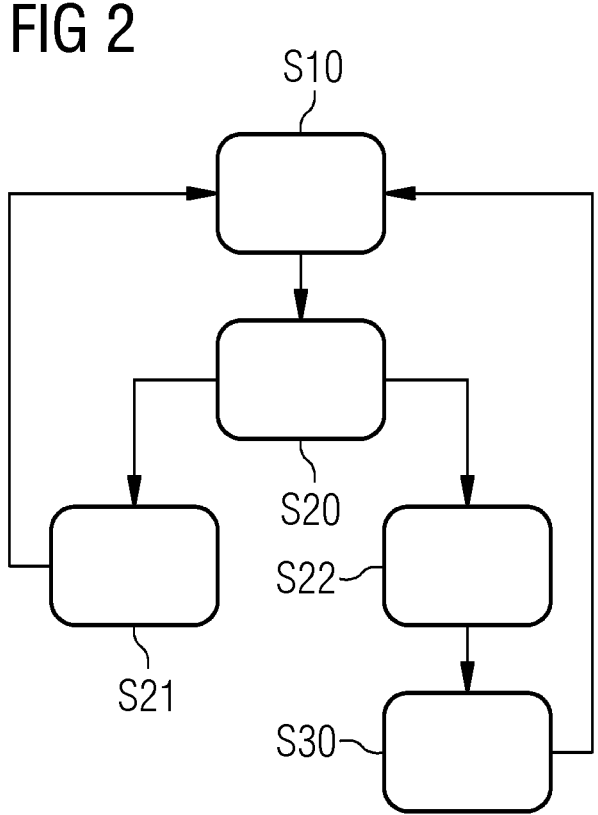
FIG. 2 shows a flow chart for explaining a method according to a first embodiment of the present invention.

FIG. 2 shows a flow chart to explain a method for providing safety to a person in a wind turbine 2 with the above described safety system 1. In step S10, the routine starts. In step S20, a safe state of the hub 4 is recognized by determining whether the rotor locks R1, R2, R3 are engaged into the locked position or whether at least one of them is released from said safe position. When it is determined that the rotor locks R1, R2, R3 are not yet engaged into the locked position, the routine returns to step S10 for a new start. When it is determined that every rotor lock R1, R2, R3 is engaged into the locked position, the routine proceeds to step S22, in which the safe signal is generated and provided. In a subsequent step S30 the safe signal is output as a visual and/or acoustical signal by means of the user communication unit 9. While outputting the safe signal, the access door from the nacelle 3 to the hub 4 will be unlocked by means of the controller 10, which is connected to the feedback unit 8.

Figure 3:
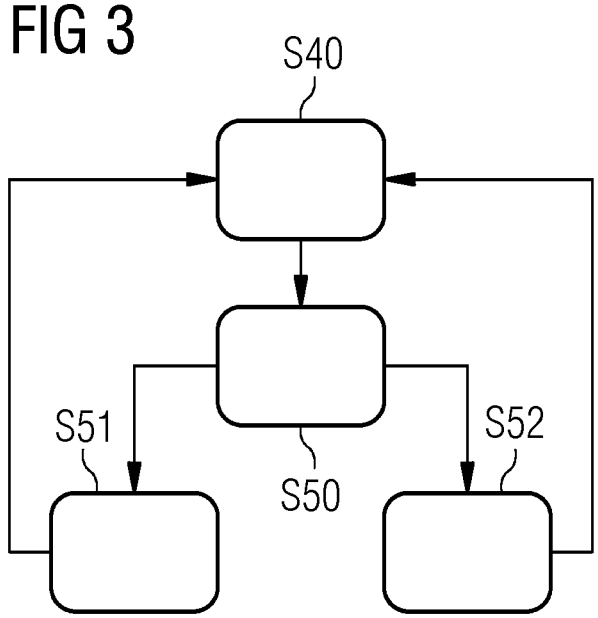
FIG. 3 shows a flow chart for explaining a method according to a second embodiment of the present invention.

FIG. 3 shows a flow chart to explain a method for providing additional safety to a person in a wind turbine 2 with the above described safety system 1. In step S40, the routine starts. In step S50, a signal is provided by means of the door signal unit 11 whether the door lock L1 of the door from the nacelle 3 to the hub 4 is locked or not. When it is detected that the door is locked, an allowing-signal will be released by the controller 10 at step S51 to allow releasing any one of the rotor locks R1, R2, R3 by means of the related switches S1, S2, S3. When it is detected that the door is unlocked, a prohibiting-signal will be released by the controller 10 at step S52 to prohibit releasing of any one of the rotor locks R1, R2, R3.

The controller 10 of the safety system 1 may be configured as a computer comprising a computer program for carrying out any one of the above described methods.

FIG. 4 shows the wind turbine 2 with the nacelle 3, the hub 4, the rotor blocking system 5 comprising three rotor locks R1, R2, R3, each engageable into the locked position for blocking the rotor 6 of the wind turbine 2 from rotating, and the above described safety system 1.

The aforesaid description of the accompanying drawings is only by the way of detail and example. Specific features of each aspect of embodiments of the present invention and the figures can be combined which each other if of technical sense.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A safety system for a wind turbine, said safety system comprising:
    a central switching unit having a housing to which a plurality of switches are mounted and within which a feedback unit and a controller connected to the feedback unit are positioned, wherein a nacelle of the wind turbine includes the central switching unit, wherein each switch of the plurality of switches is connected to a respective rotor lock of a plurality of rotor locks of the wind turbine, and wherein each switch is configured for manually engaging the respective rotor lock into a locked position when activated and for manually releasing the respective rotor lock when an access door from the nacelle of the wind turbine to a hub of the wind turbine is locked,
    said feedback unit configured to generate a safe-signal as soon as the plurality of rotor locks is engaged into the locked position in a safe state, and
    said controller configured to unlock the access door in response to the safe-signal having been received by the controller from the feedback unit.

2. The safety system according to claim 1, said switching unit comprising:
    a door signal unit configured to provide a locked-signal in a locked state of a door lock of the access door from the nacelle of the wind turbine to the hub of the wind turbine, wherein the controller is connected to the door signal unit for allowing to release any one rotor lock of the plurality of rotor locks only in response to the controller receiving the locked-signal from the door signal unit.

3. The safety system according to claim 2, wherein the controller is configured to release a prohibiting signal that prohibits release of any rotor lock of the plurality of rotor locks in response to a detection, by the door signal unit, that the access door is unlocked.

4. The safety system according to claim 1, wherein the feedback unit is integrated into the central switching unit.

5. The safety system according to claim 1, said central switching unit comprising:
a user communication unit, within the housing of the central switching unit and connected to the feedback unit, for providing the safe-signal by visually and/or acoustically informing a person at the central switching unit about the safe state when receiving the provided safe-signal by the user communication unit, wherein the communication unit and the feedback unit are external to each other.

6. The safety system according to claim 1, wherein each switch is configured for manually engaging only the respective rotor lock into the locked position when activated and for manually releasing only the respective rotor lock when the access door from the nacelle of the wind turbine to the hub of the wind turbine is locked.

7. The safety system according to claim 1, wherein each switch is independently selected from the group consisting of a button configured to be pressed, a lever configured to be shifted, and a switch structure into which a mechanical key may be inserted and turned.

8. The safety system according to claim 1, wherein the housing is mounted to an inner wall of the nacelle, and wherein the plurality of switches are mounted to be operated on an outer wall member of the housing.

9. The safety system according to claim 1, wherein the access door is configured to be unlocked only in response to the safe-signal having been received by the controller from the feedback unit.

10. The safety system according to claim 1, wherein each switch is configured to release the respective rotor lock only when the access door is locked.

11. The safety system according to claim 1, wherein the safe signal is visually displayed on a display unit at the housing and/or audibly communicated by a loudspeaker at the housing.

12. A wind turbine, said wind turbine comprising:
a nacelle,
a hub,
a rotor blocking system comprising a plurality of rotor locks, each rotor lock engageable into a locked position for blocking a rotor of the wind turbine from rotating, and
a safety system comprising a central switching unit having a housing to which a plurality of switches are mounted and within which a feedback unit and a controller connected to the feedback unit are positioned, wherein the nacelle of the wind turbine includes the central switching unit, wherein each switch of the plurality of switches is connected to a respective rotor lock of the plurality of rotor locks, and wherein each switch is configured for manually engaging the respective rotor lock into the locked position when activated and for manually releasing the respective rotor lock when an access door from the nacelle of the wind turbine to a hub of the wind turbine is locked,
said feedback unit configured to generate a safe-signal in a safe state as soon as the plurality of rotor locks is engaged into the locked position in the safe state, and
said controller configured to unlock the access door in response to the safe-signal having been received by the controller from the feedback unit.

13. The wind turbine according to claim 12, said central switching unit comprising:
a user communication unit, within the housing of the central switching unit and connected to the feedback unit, for providing the safe-signal by visually and/or acoustically informing a person at the central switching unit about the safe state when receiving the provided safe-signal by the user communication unit, wherein the communication unit and the feedback unit are external to each other.

14. A method for providing safety to a person in a wind turbine, said method comprising:
providing a safety system comprising a central switching unit having a housing to which a plurality of switches are mounted and within which a feedback unit and a controller connected to the feedback unit are positioned, wherein a nacelle of the wind turbine includes the central switching unit, wherein each switch of the plurality of switches is connected to a respective rotor lock of a plurality of rotor locks of the wind turbine, and wherein each switch is configured for manually engaging the respective rotor lock into a locked position when activated and for manually releasing the respective rotor lock when an access door from the nacelle of the wind turbine to a hub of the wind turbine is locked,
manually releasing the respective rotor lock when an access door from the nacelle of the wind turbine to a hub of the wind turbine is locked,
said feedback unit generating a safe-signal in a safe state as soon as the plurality of rotor locks is engaged into the locked position in the safe state, and
unlocking, by the controller, the access door in response to the safe-signal having been received by the controller from the feedback unit.

15. The method according to claim 14, wherein the safe-signal visually and/or acoustically informs the person at the central switching unit in the nacelle about the safe state by a user communication unit connected to the feedback unit when receiving the provided safe-signal by the user communication unit, and wherein the safe signal is in the safe state in which each rotor lock is locked into the locked position.

16. The method according to claim 14, said method comprising:
providing, by a door signal unit in the central switching unit, a locked-signal in a locked state of a door lock of the access door from the nacelle to the hub, and
allowing release of any one rotor lock of the plurality of rotor locks only in response to the controller receiving the locked-signal from the door signal unit.

17. The method according to claim 14, wherein the central switching unit comprises a user communication unit within the housing of the central switching unit and connected to the feedback unit, wherein the communication unit and the feedback unit are external to each other, said method comprising:
providing the safe-signal by visually and/or acoustically informing the person at the central switching unit about the safe state when receiving the provided safe-signal by the user communication unit.

18. The method according to claim 14, said method comprising:
  recognizing the safe state, in which every rotor lock is engaged into the locked position; and
  in response to said recognizing the safe state, generating the safe-signal.

\* \* \* \* \*